United States Patent Office 3,095,434
Patented June 25, 1963

3,095,434
ORGANOTIN SULFONATES
Walter A. Stamm, Dobbs Ferry, and Arthur W. Breindel, Yonkers, N.Y., and Ashley H. Freiberg, Santa Clara, Calif., assignors to Stauffer Chemical Company, New York, N.Y., a corporation of Delaware
No Drawing. Filed June 27, 1961, Ser. No. 119,775
10 Claims. (Cl. 260—429.7)

The present invention relates to certain novel organotin compounds which are useful as pesticides. The invention is particularly concerned with organotin compounds characterized by the presence of a methylsulfonyl or mesyl grouping ($-SO_2-CH_3$) and to methods of preparing and using such entities.

The organotin compounds as contemplated herein can be formalistically depicted as follows:

(I) $(R)_x-Sn-(Z-SO_2-CH_3)_{4-x}$ wherein R signifies an alkyl group having from 1 to 12 carbon atoms such as methyl, ethyl, n-propyl, iso-propyl, n-butyl, iso-butyl, sec-butyl, n-pentyl, iso-pentyl, iso-hexyl, n-hexyl, n-heptyl, sec-heptyl, n-octyl, iso-octyl, iso-nonyl, n-nonyl, n-decyl, sec-decyl, iso-decyl, n-undecyl, iso-indecyl, n-dodecyl, iso-dodecyl etc., an aryl nucleus such as a phenyl group or a naphthyl group in which the aryl nucleus may be substituted by relatively inert groupings such as lower alkyl, lower alkoxyl, etc.; Z designates a divalent element of group VI of the periodic table as exemplified by oxygen and sulfur and $x$ is an integer of from 2 to 3.

Formula I can be resolved into two sub-generic formulae of the following configuration:

(IIa) $(R)_2-Sn-(Z-SO_2-CH_3)_2$
and
(IIb) $(R)_3-Sn-Z-SO_2-CH_3$ wherein Z has the values previously assigned. Structures falling within the ambit of Formula I are the dialkyltin and diaryltin bis-methanesulfonates and corresponding bis-methanethiolsulfonates. Compounds illustrative of sub-generic Formula IIa include the following:

(1) Dimethyltin bis-methanesulfonate
(2) Diethyltin bis-methanesulfonate
(3) Diethyltin bis-methanethiolsulfonate
(4) Di-n-propyltin bis-methanesulfonate
(5) Di-iso-propyltin bis-methanesulfonate
(6) Di-n-butyltin bis-methanesulfonate
(7) Di-n-butyltin bis-methanethiolsulfonate
(8) Di-iso-butyltin bis-methanesulfonate
(9) Di-n-pentyltin bis-methanesulfonate
(10) Di-n-hexyltin bis-methanesulfonate
(11) Di-iso-hexyltin bis-methanesulfonate
(12) Di-iso-hexyltin bis-methanethiolsulfonate
(13) Di-n-octyltin bis-methanesulfonate
(14) Di-n-decyltin bis-methanesulfonate
(15) Di-n-dodecyltin bis-methanesulfonate
(16) Dinaphthyltin bis-methanesulfonate
(17) Diphenyltin bis-methanesulfonate
(18) Diphenyltin bis-methanethiolsulfonate Compounds illustrative of sub-generic Formula IIb are spelled out in the following list:

(19) Trimethyltin methansulfonate
(20) Triethyltin methanesulfonate
(21) Tri-n-propyltin methanesulfonate
(22) Tri-iso-butyltin methanethiolsulfonate
(23) Tri-iso-butyltin methanesulfonate
(24) Tri-n-butyltin methanethiolsulfonate
(25) Tri-n-hexyltin methanethiolsulfonate
(26) Tri-n-hexyltin methanesulfonate
(27) Tri-n-heptyltin methanesulfonate
(28) Tri-iso-octyltin methanesulfonate
(29) Tri-iso-decyltin methanethiolsulfonate
(30) Tri-n-undecyltin methanethiolsulfonate
(31) Tri-n-undecyltin methanesulfonate
(32) Tri-n-dodecyltin methanethiolsulfonate
(33) Triphenyltin methanesulfonate
(34) Triphenyltin methanethiolsulfonate The organotin compounds described herein are characterized by the presence of a methylsulfonyl group, i.e., a $-SO_2-CH_3$ radical. In accordance with the invention, such organotin compounds are prepared by reacting a mesyl derivative of the formula:

(III) $M-Z-SO_2-CH_3$ wherein Z has the values previously assigned and M stands for hydrogen, an ammonium radical or a metal, particularly an alkali metal such as lithium, sodium, potassium or the like with an organotin intermediate of the type represented by the following formulae:

(IVa) $(R)_4-Sn$
(IVb) $(R)_2-Sn=O$
and
(IVc) $(R)_3-Sn-Cl$
(IVd) $(R)_2-Sn-Cl_2$ wherein R has the significance as above designated. When the reaction is carried out using an organotin intermediate of the type as set forth in Formula IVa or IVb, the requisite mesyl derivative is desirably employed in its acid form, that is when M is hydrogen in Formula III. If, on the other hand, the reaction is performed using an organotin halide intermediate as illustrated in Formula IVc or IVd then the mesyl derivative is employed as a salt corresponding to Formula III when M is a metal or ammonium radical.

In some instances it may be advantageous to combine the reactants in the presence of a relatively inert organic solvent and in this connection, mention is made of aromatic hydrocarbons such as benzene, toluene, xylene etc., polyalkylene glycol ethers as represented by diethyleneglycol dimethylether, diethyleneglycol diethylether and the like.

As previously pointed out, the herein contemplated organotin derivatives are characterized by the presence of a methylsulfonyl function, i.e., $-SO_2-CH_3$ group. The components utilized to provide this function are defined generally by Formula III which includes methanesulfonic acid, methanethiolsulfonic acid and the metal and ammonium salts thereof.

Reference is now made to the following examples which are included solely for the purpose of illustration since it will be apparent to those skilled in the art that the invention is susceptible to modifications and variations without departing from the spirit or scope thereof.

EXAMPLE 1

*Di-n-Butyltin Bis-Methanesulfonate*

$(n-C_4H_9)_2-Sn-(O-SO_2-CH_3)_2$

A three-necked reaction flask equipped with stirrer, reflux condenser with Dry-Ice trap and thermometer, was charged with 17.4 parts of tetra-n-butyltin and 9.6 parts of methanesulfonic acid. Upon heating to about 120° C., with agitation, a reaction starts with evolution of isobutane and formation of a white precipitate. Heating at 120° C. was maintained for four hours during which time four parts of liquid isobutane was collected in the Dry-Ice trap. The crude material was washed twice with hexane and dissolved in 20 parts of warm methanol. After crystallizing from methanol, 20.3 parts (96% of theory) of a colorless, crystalline product was obtained, M.P. 306–

309° C., which on chemical analysis corresponded to the above structure.

EXAMPLE 2

Di-n-Propyltin Bis-Methanesulfonate $$(n\text{-}C_3H_7)_2\text{—Sn—}(O\text{—}SO_2\text{—}CH_3)_2$$

Tetra-n-propyltin (14.3 parts) was contacted with 9.5 parts of methanesulfonic acid under conditions identical to those of Example 1. After washing the product with hexane and crystallizing from methanol, 18.4 parts of a colorless crystalline solid was obtained, M.P. 279–284° C. This was identified as di-n-propyltin bis-methanesulfonate.

EXAMPLE 3

Diisohexyltin Bis-Methanesulfonate $$(iso\text{-}C_6H_{13})_2\text{—Sn—}(O\text{—}SO_2\text{—}CH_3)_2$$

Example 1 was repeated except that 8 parts of tetraisohexyltin was reacted with 3.3 parts of methanesulfonic acid at 140° C. for 2 hours. After crystallizing from methanol, 6.3 parts of a colorless crystalline product was obtained, M.P. 205–206° C. This was identified as diisohexyltin bis-methanesulfonate.

EXAMPLE 4

Tri-n-Propyltin Methanesulfonate $$(n\text{-}C_3H_7)_3\text{—Sn—}O\text{—}SO_2\text{—}CH_3$$

Tetra-n-propyltin (29.1 parts) was reacted with 9.6 parts of methanesulfonic acid for 3 hours at 95° C. under conditions similar to those of Example 1. After washing the crude material with hexane, the solid was recrystallized from benzene. Seven parts of a colorless crystalline product was obtained, M.P. 131–133° C. This was identified as tri-n-propyltin methanesulfonate.

EXAMPLE 5

Triisobutyltin Methanesulfonate $$(n\text{-}C_4H_9)_3\text{—Sn—}O\text{—}SO_2\text{—}CH_3$$

Example 1 was repeated except that 22.8 parts of tetraisobutyltin was reacted with 6.3 parts of methanesulfonic acid. The crude material was washed with hexane, and then extracted with boiling diethylether to remove a small quantity of diisobutyltin bis-methanesulfonate. After evaporating the ether, 11.5 parts of a colorless crystalline solid was obtained, M.P. 135–140° C. This was identified as triisobutyltin methanesulfonate.

EXAMPLE 6

Di-n-Butyltin Bis-Methanesulfonate $$(n\text{-}C_4H_9)_2\text{—Sn—}(O\text{—}SO_2\text{—}CH_3)_2$$

Eighteen parts of di-n-butyltin oxide was dispersed in 200 parts of toluene. With agitation, the mixture was heated to reflux and 13.9 parts of methanesulfonic acid was added through a dropping funnel. After 3 hours of reflux, 1.3 parts of water was distilled azeotropically with toluene from the mixture and the white solid filtered off. On crystallizing from absolute ethanol, 25 parts of a colorless crystalline product was obtained, M.P. 308–310° C. This was identified as di-n-butyltin bis-methanesulfonate.

EXAMPLE 7

Triphenyltin Methanesulfonate

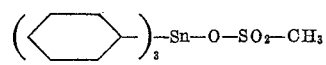

Tetraphenyltin (24.4 parts) was reacted with 4.8 parts of methanesulfonic acid for 4½ hours under conditions similar to those of Example 6. After filtering and washing twice with hot toluene, 12 parts of a colorless crystalline product was obtained, which sublimes between 275–320° C. at atmospheric pressure. This was identified as triphenyltin methanesulfonate.

EXAMPLE 8

Di-n-Butyltin Bis-Methanethiolsulfonate $$(n\text{-}C_4H_9)_2\text{—Sn—}(S\text{—}SO_2\text{—}CH_3)_2$$

Twenty seven parts of sodium methanethiolsulfonate was dispersed in 100 parts of absolute diethyleneglycol dimethylether. With agitation, this mixture was brought to 140° C., and 30 parts of di-n-butyltin dichloride, dissolved in 20 parts of acetone, was added through a dropping funnel. After a three hour reaction time, the mixture was cooled to 80° C., and 200 parts of warm water added with continued agitation, whereupon the desired reaction product precipitated. It was filtered at room temperature, washed with water, a small amount of cold alcohol, and several times with hexane. Thirty parts of a light yellow crystalline product was obtained, M.P. 106° C. It was identified as di-n-butyltin bis-methanethiolsulfonate.

EXAMPLE 9

Tri-n-Butyltin Methanethiolsulfonate $$(n\text{-}C_4H_9)_3\text{—Sn—}S\text{—}SO_2\text{—}CH_3$$

Thirteen parts of sodium methanethiosulfonate was reacted with 33 parts of tri-n-butyltin monochloride under conditions described under Example 8. The product was a yellow oil which was separated and purified by several water washes, followed by fractional vacuum distillation. The purified tri-n-butyltin methanethiolsulfonate boiled at 98–100° C. at 0.2 mm.

EXAMPLE 10

Triphenyltin Methanethiolsulfonate

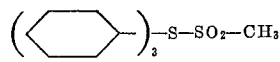

A mixture of 13 parts of sodium methanethiolsulfonate and 38 parts of triphenyltin monochloride was refluxed with vigorous agitation in 50 parts of water and 50 parts of xylene for 6 hours. The triphenyltin methanethiolsulfonate formed between the water-xylene phases as an amorphous, colorless powder. After washing with ether and water 11 parts of purified product was obtained, M.P. >350° C.

EXAMPLE 11

Tri-Iso-Decyltin Methanesulfonate $$(iso\text{-}C_{10}H_{21})_3\text{—Sn—}O\text{—}SO_2\text{—}CH_3$$

Following the procedure as given in Example 5, tetra-iso-decyltin was condensed with methanesulfonic acid. The results fell in line with those of the previous examples for this type of organotin derivative.

The organotin compounds of this invention are new and useful chemical entities. For instance, they display general biocidal activity being effective in controlling insects and related pesticidal organisms. They can also be compounded or formulated to produce new and useful herbicidal compositions. Our new organotin derivatives have proved to be effective polymerization catalysts and, in this connection, mention is made of their use for producing polyurethane foams of the type formed by reacting isocyanates with glycol intermediates such as polyetherglycols. In addition to the aforesaid uses, the organotin compounds of this invention show stabilizing properties in such applications as the formulation of plastic compositions of which polyvinyl chloride and copolymers thereof are examples.

It has previously been pointed out that the herein contemplated organotin compounds exhibit insecticidal activity and this valuable property has been utilized in formulating insecticidal compositions containing the aforesaid entities as an active component therein. It has also been discovered that the organotin derivatives of the invention exhibit activity toward a variety of microorganisms such as fungi and the like and this represents another new and valuable utility for these materials.

We claim:
1. An organotin compound of the formula:

$$(R)_x Sn-(Z-SO_2-CH_3)_{4-x}$$

wherein R is selected from the class consisting of an alkyl group of from 1 to 12 carbon atoms, a phenyl group and a naphthyl group, Z is selected from the class consisting of oxygen and sulfur atoms and $x$ designates an integer of from 2 to 3.
2. Di-n-propyltin bis-methanesulfonate.
3. Tri-n-propyltin methanesulfonate.
4. Di-n-butyltin bis-methanesulfonate.
5. Tri-n-butyltin methanesulfonate.
6. Tri-iso-butyltin methanesulfonate.
7. Tri-iso-hexyltin methanesulfonate.
8. Di-n-butyltin bis-methanethiolsulfonate.
9. Tri-n-butyltin methanethiolsulfonate.
10. Triphenyltin methanethiolsulfonate.

References Cited in the file of this patent

UNITED STATES PATENTS 2,910,452    Crauland _____ Oct. 27, 1959

OTHER REFERENCES

Luijten: "Investigations in Org. Chem." (October 1955), published by Tin Research (Middlesex, England), pp. 9, 15, 22, and 24.